United States Patent Office 2,922,830
Patented Jan. 26, 1960

2,922,830

SYNTHESIS OF p-MENTHENE-3

Robert Roger Bottoms, Crestwood, Ky., assignor to Chemetron Corporation, Chicago, Ill., a corporation of Delaware No Drawing. Application February 21, 1955
Serial No. 489,755

5 Claims. (Cl. 260—675.5)

This invention relates to a method of producing $\Delta^3$-p-menthene (hereinafter referred to as "p-menthene-3") from lower alkyl dihydro-alpha-terpinyl ethers. More particularly this invention relates to the production of p-menthene-3 from lower alkyl dihydro-alpha-terpinyl ethers by reaction at elevated temperatures with a small amount of a sulfonic acid, causing the elements of lower alkanol to be split off, and the resulting double bond to be isomerized into the 3-position in the ring.

p-Menthene-3 has the formula:

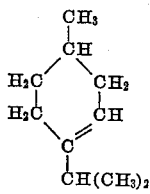

It is a useful starting material in the preparation of synthetic menthol and has heretofore been relatively inaccessible. It occurs naturally in trace amounts in certain vegetable oils and has been synthesized in the laboratory from menthol and menthyl chloride, but no method has been reported for its efficient production in large quantity from common and inexpensive terpenes. A synthetic method for producing p-menthene-3 on a commercial scale is therefore highly desirable.

It is the object of this invention to provide a method of producing p-menthene-3 from readily available materials. It is a further object to provide a method for producing p-menthene-3 by a simple process in high yield from lower alkyl dihydro-alpha-terpinyl ethers. Other objects of the invention will be apparent from the following disclosure.

The lower alkyl dihydro-alpha-terpinyl ethers which are the starting materials for the present invention have the general formula:

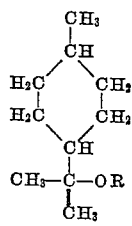

wherein R represents a lower alkyl radical such as methyl, ethyl, propyl, isopropyl, or butyl. These ethers are more precisely named as 8-alkoxy-p-menthanes. They are readily prepared by catalytic hydrogenation of the corresponding lower alkyl alpha-terpinyl ethers (better known as 8-alkoxy-1-p-menthanes) which are known to the art or can be produced from limonene by reaction with a lower alkanol in the presence of sulfuric acid.

Broadly, the present invention concerns the reaction of lower alkyl dihydro-alpha-terpinyl ethers when heated in the presence of a sulfonic acid to cause the elements of lower alkanol to be split out, giving a mixture of three isomeric terpenes, namely, p-menthene-8(9), p-menthene-4(8) and p-menthene-3, the latter predominating. After the lower alkanol has been eliminated the temperature of the mixture is raised gradually to about 130° to 140° C. at which point the mixture of isomers will be converted almost exclusively to p-menthene-3. The hydrocarbon fraction is washed with water or dilute alkali to remove the acid catalyst and is then purified by fractional distillation. The product distilling in the range of 166° to 170° C. at 760 millimeters' pressure is collected as pure p-menthene-3.

For catalyst in the reaction one or more of the common organic sulfonic acids may be used. Among these acids are benzenesulfonic acid, toluenesulfonic acid, lower alkanesulfonic acids, including methanesulfonic, ethanesulfonic, and propanesulfonic acids. Besides hydrocarbon sulfonic acids listed above, substituted hydrocarbon sulfonic acids, such as phenolsulfonic acids, are likewise suitable for the reaction and subsequent isomerization. The amount of acid used to catalyze the splitting out of lower alkanol and subsequent isomerization is rather small, generally being in the range of 1% to 3% by weight of the lower alkyl dihydro-alpha-terpinyl ether employed.

The invention is further disclosed by the following representative example, which is provided for the purpose of illustrating the invention, but which is not to be construed as limiting it in scope. Relative amounts of materials are given in parts by weight and temperatures are recorded in degrees centigrade.

Example 1250 parts of methyl alpha-terpinyl ether (known also as 8-methoxy-1-p-menthane) are placed in an autoclave with about 20 parts of Raney nickel. The temperature is brought to about 125° C. and hydrogen is introduced until a pressure of 150 to 300 lbs. per square inch is obtained. Agitation is commenced and maintained until no further absorption of hydrogen takes place. The contents of the autoclave are cooled and removed. The catalyst is separated from the methyl dihydro-alpha-terpinyl ether (also known as 8-methoxy-p-menthane), preferably by filtration.

The methyl dihydro-alpha-terpinyl ether is then placed in a still with about 50 parts of mixed alkanesulfonic acid consisting essentially of methane-, ethane- and propanesulfonic acids. The resulting mixture is subjected to slow distillation. After about 2 hours the calculated amount of methanol will have been collected as distillate. Heating is continued and the contents of the still are allowed to reach a temperature of about 135° to 140° C. and held at this temperature for about ½ hour. The product is then cooled, washed thoroughly with water, dried and fractionated through an efficient reflux column. The product distilling in a temperature range between 166° and 170° C. is collected as pure p-menthene-3. The overall yield based upon the amount of the limonene consumed is between 70% and 80%.

What is claimed as new and desired to be secured by Letters Patent of the United States is:

1. A method of producing p-menthene-3 from a lower alkyl dihydro-alpha-terpinyl ether which comprises heating said lower alkyl dihydro-alpha-terpinyl ether with a lower hydrocarbon sulfonic acid at a temperature above about 75° C. and below about 140° C. and separating the p-menthene-3 thus formed.

2. A method of producing p-menthene-3 from a lower alkyl dihydro-alpha-terpinyl ether which comprises heating said lower alkyl dihydro-alpha-terpinyl ether with 1% to 5% by weight of a lower hydrocarbon sulfonic acid at a temperature range of about 75° to 140° C.

to remove the lower alkanol evolved and separating the p-menthene-3 thus formed.

3. A method of producing p-menthene-3 from a lower alkyl dihydro-alpha-terpinyl ether which comprises heating said lower alkyl dihydro-alpha-terpinyl ether with 1% to 5% by weight of lower alkanesulfonic acid at a temperature in the range of about 75° to 140° C. until substantially one mole of lower alkanol is removed for each mole of lower alkyl dihydro-alpha-terpinyl ether and separating the p-menthene-3 thus formed.

4. A method of producing p-menthene-3 from a lower alkyl dihydro-alpha-terpinyl ether which comprises heating a lower alkyl dihydro-alpha-terpinyl ether with 3% by weight of lower alkanesulfonic acid at a temperature in the range of 100° to 140° C., collecting the lower alkanol evolved until substantially the theoretical amount is collected, washing the organic residue to remove sulfonic acid, and separating the p-menthene-3 thus obtained.

5. A method of producing p-menthene-3 from methyl dihydro-alpha-terpinyl ether which comprises mixing methyl-dihydro-alpha-terpinyl ether with 3% by weight of a mixture of lower alkanesulfonic acids comprising methanesulfonic, ethanesulfonic, and propanesulfonic acids, heating said mixture in a still at a temperature above 100° C. and below 140° C., collecting the methanol distilled until substantially one mole is collected for each mole of methyl dihydro-alpha-terpinyl ether, washing the still residue with water to remove acids, separating the hydrocarbon fraction and purifying the p-menthene-3 by distillation.

References Cited in the file of this patent
UNITED STATES PATENTS

| | | |
|---|---|---|
| 1,999,061 | Schoeller et al. | Apr. 23, 1935 |
| 2,376,286 | Smith et al. | May 15, 1945 |